United States Patent
Bent et al.

(10) Patent No.: US 9,563,426 B1
(45) Date of Patent: Feb. 7, 2017

(54) PARTITIONED KEY-VALUE STORE WITH ATOMIC MEMORY OPERATIONS

(71) Applicant: EMC Corporation, Hopkinton, MA (US)

(72) Inventors: John M. Bent, Los Alamos, NM (US); Sorin Faibish, Newton, MA (US); Gary Grider, Los Alamos, NM (US)

(73) Assignees: EMC IP Holding Company LLC, Hopkinton, MA (US); Los Alamos National Security, Los Alamos, NM (US)

( * ) Notice: Subject to any disclaimer, the term of this patent is extended or adjusted under 35 U.S.C. 154(b) by 176 days.

(21) Appl. No.: 14/502,231

(22) Filed: Sep. 30, 2014

(51) Int. Cl.
| | |
|---|---|
| G06F 15/16 | (2006.01) |
| G06F 9/30 | (2006.01) |
| H04L 29/06 | (2006.01) |
| H04L 29/08 | (2006.01) |
| G06F 15/173 | (2006.01) |

(52) U.S. Cl.
CPC ....... G06F 9/3004 (2013.01); G06F 15/17331 (2013.01); H04L 67/1097 (2013.01); H04L 67/42 (2013.01)

(58) Field of Classification Search
CPC ............... G06F 9/45; G06F 9/52; G06F 9/54; G06F 9/3001; G06F 9/3004; G06F 9/30087; G06F 9/3851; G06F 9/522; H04L 29/08; H04L 45/02; H04L 45/04
USPC ........................................................ 709/203
See application file for complete search history.

(56) References Cited

U.S. PATENT DOCUMENTS

| | | | | |
|---|---|---|---|---|
| 7,437,521 | B1 * | 10/2008 | Scott ..................... | G06F 9/3001 711/151 |
| 8,307,194 | B1 * | 11/2012 | Scott ................... | G06F 9/30094 712/34 |
| 9,160,607 | B1 * | 10/2015 | Froese ................ | H04L 12/2602 |
| 9,235,609 | B1 * | 1/2016 | Pandey ............. | G06F 17/30309 |
| 2013/0132397 | A1 * | 5/2013 | MacMillan ........ | G06F 17/30336 707/744 |
| 2013/0275656 | A1 * | 10/2013 | Talagala .............. | G06F 12/0246 711/103 |
| 2013/0275699 | A1 * | 10/2013 | Cheriton ................. | G06F 12/00 711/162 |
| 2014/0032504 | A1 * | 1/2014 | Golab ............... | G06F 17/30424 707/690 |

(Continued)

*Primary Examiner* — Tauqir Hussain
(74) *Attorney, Agent, or Firm* — Ryan, Mason & Lewis, LLP

(57) ABSTRACT

A partitioned key-value store is provided that supports atomic memory operations. A server performs a memory operation in a partitioned key-value store by receiving a request from an application for at least one atomic memory operation, the atomic memory operation comprising a memory address identifier; and, in response to the atomic memory operation, performing one or more of (i) reading a client-side memory location identified by the memory address identifier and storing one or more key-value pairs from the client-side memory location in a local key-value store of the server; and (ii) obtaining one or more key-value pairs from the local key-value store of the server and writing the obtained one or more key-value pairs into the client-side memory location identified by the memory address identifier. The server can perform functions obtained from a client-side memory location and return a result to the client using one or more of the atomic memory operations.

20 Claims, 7 Drawing Sheets

(56) References Cited

U.S. PATENT DOCUMENTS

2014/0280372 A1* 9/2014 Huras ............... G06F 17/30584
　　　　　　　　　　　　　　　　　　　　　　707/803
2014/0325115 A1* 10/2014 Ramsundar ......... G06F 12/0238
　　　　　　　　　　　　　　　　　　　　　　711/102
2016/0321295 A1* 11/2016 Dalton .............. G06F 17/30194

* cited by examiner

```
mdhim_amo_put(char *key, void *memaddr, size_t length, event *event);
mdhim_amo_get(char *key, void *memaddr, event *event);
mdhim_amo_put_list(char *key[], void *memadd[], size_t length[], event *event);
mdhim_amo_get_list(char *key[], void *memadd[], size_t len[], event *event);
    The memaddr is a local address on the client to which the server will RDMA the value
mdhim_execute(function_point *fp, event *event);
mdhim_poll(event *event);
    Query whether the previously issued request is done
```

```
mdhim_amo_put(char *key, void *memaddr, size_t length, event *event) {
    thread_pool_insert(new put_operation(key, memaddr, length, event));
} mdhim_worker(thread_pool tp, local_keyvalue_store local_kv) {
    while (tp.not_empty()) {
        task = tp.pop();
        if (task.istype(insert)) {
            (key, memaddr, length, event) = task.parse();
            buffer = malloc(length); // or there can be a pool of preallocated buffers
            rdma_copy(buffer, memaddr, length); // copy using RDMA from application mem
            local_kv.put(key, buffer, length); // do the local insert
            event.setfinished();
            // could optionally optimistically send the event completion status to client
        }
        ~~~
    }
    ~~~
}
```

600

PARTITIONED KEY-VALUE STORE WITH ATOMIC MEMORY OPERATIONS

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

CROSS-REFERENCE TO RELATED APPLICATIONS

The present application is related to U.S. patent application Ser. No. 14/143,758, filed Dec. 30, 2013, entitled "Partitioned Key-Value Store With One-Sided Communications for Secondary Global Key Lookup by Range-Knowledgeable Clients," U.S. patent application Ser. No. 14/143,771, filed Dec. 30, 2013, entitled "Parallel Sort With a Ranged, Partitioned Key-Value Store in a High Performance Computing Environment," and U.S. patent application Ser. No. 14/143,749, filed Dec. 30, 2013, entitled "Parallel Storage System with Burst Buffer Appliance for Storage of Partitioned Key-Value Store Across a Plurality of Storage Tiers," each incorporated by reference herein.

FIELD

The field relates generally to data storage, and more particularly, to partitioned key-value data stores.

BACKGROUND

Key-value stores are a powerful tool to store and retrieve large amounts of data for activities such as data analysis. One difficulty in creating these key-value stores is the need for parallelism. The large amount of data that must be stored makes a key-value store on a single node impractical for most workloads. Thus, distributed key-value stores have been proposed for storing a partitioned key-value store (often referred to as a partitioned data store) on a number of parallel nodes.

Multidimensional Data Hashing Indexing Middleware (MDHIM) is an example of a framework for partitioned data stores. In a typical MDHIM implementation, one or more MDHIM clients run on each of the compute nodes and communicate with a plurality of MDHIM servers also running on the same or different compute nodes in a parallel file system. Each MDHIM server stores a partition of the key-value store. A given MDHIM server storing a particular sub-range of the key-value store is contacted to read or write key-values within the sub-range.

One challenge in a partitioned key-value store is the amount of key-value data that must be transferred, stored and processed. Thus, MDHIM employs low-latency Message Passing Interface (MPI) communications across the user-space of high performance computing (HPC) compute nodes to create a single virtual key-value store across a set of local key-value stores using ordered key-ranges.

While MDHIM has significantly improved the performance of partitioned data stores in an HPC environment, a need remains for a partitioned data store that supports server-side atomic memory operations.

SUMMARY

Illustrative embodiments of the present invention provide partitioned key-value stores with atomic memory operations. In one exemplary embodiment, a server performs a memory operation in a partitioned key-value store by receiving a request from an application for at least one atomic memory operation, the atomic memory operation comprising a memory address identifier; and, in response to the atomic memory operation, performing one or more of (i) reading a client-side memory location identified by the memory address identifier and storing one or more key-value pairs from the client-side memory location in a local key-value store of the server; and (ii) obtaining one or more key-value pairs from the local key-value store of the server and writing the obtained one or more key-value pairs into the client-side memory location identified by the memory address identifier. The partitioned key-value store is optionally based on a MDHIM framework that employs MPI communications.

According to one aspect of the invention, program control returns to the application once the server receives the request from the application for the atomic memory operation. According to another aspect of the invention, the server optionally performs one or more functions obtained from the client-side memory location. The server returns a result of the one or more functions to the client using one or more of the atomic memory operations.

As noted above, illustrative embodiments described herein provide significant improvements relative to conventional arrangements. In some of these embodiments, use of server-side atomic memory operations in a partitioned key-value store offloads the computation for Input/Output (I/O) operations to the server and thereby permits the client to perform other work while the server-side processing occurs. In this manner, server-directed data flow is provided for improved data analytics and HPC tasks.

BRIEF DESCRIPTION OF THE DRAWINGS

FIG. 5 illustrates portions of an exemplary client application programming interface (API) incorporating aspects of the present invention;

FIG. 6 illustrates exemplary pseudo code for a server-side put operation (using the exemplary client API of FIG. 5);

DETAILED DESCRIPTION

Figure 1:
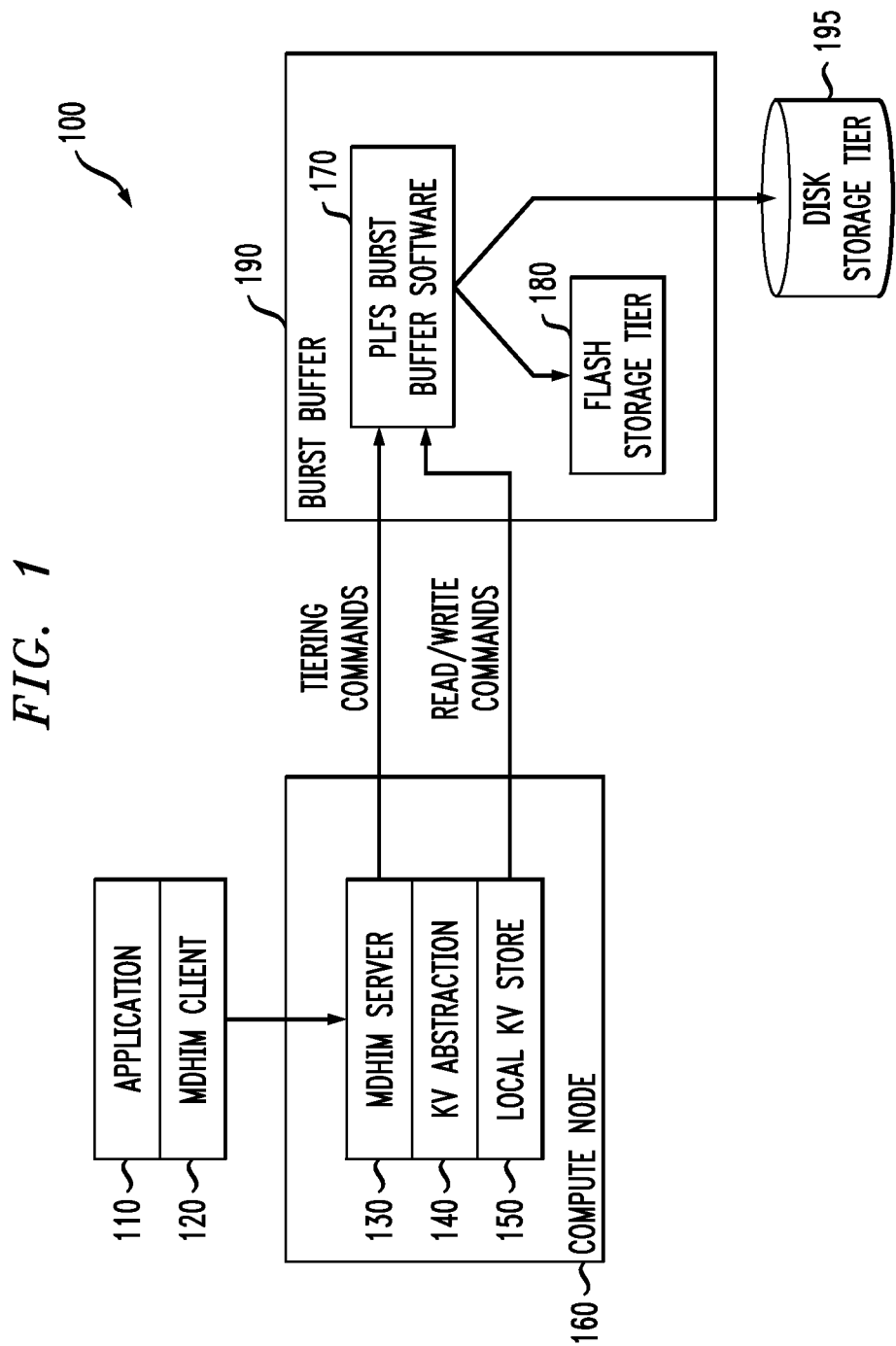
FIG. 1 illustrates an exemplary partitioned key-value store in which the invention may be implemented.

Illustrative embodiments of the present invention will be described herein with reference to exemplary partitioned data stores and associated clients, servers, storage arrays and other processing devices. It is to be appreciated, however, that the invention is not restricted to use with the particular illustrative partitioned data stores and device configurations shown. Accordingly, the terms "partitioned data store" and "partitioned key-value store" as used herein are intended to be broadly construed.

Aspects of the present invention provide partitioned key-value stores with atomic memory operations. While the exemplary embodiments of the present invention employ MDHIM, other MPI-Linked partitioned data stores can be employed, as would be apparent to a person of ordinary skill in the art. As used herein, an atomic memory operation comprises a memory operation that is applied to memory and either completely succeeds or completely fails. There is no danger of a partial completion (which could result in a data inconsistency).

According to one aspect of the invention, server-side atomic memory operations in a partitioned key-value store offloads at least a portion (i.e., some or all) of the computation for Input/Output (I/O) operations to the server and thereby permits the client to perform other work while the server-side processing occurs. In one exemplary embodiment, the application requests the server to perform one or more functions or procedures that are stored in a particular client-side memory location. The client transmits the functions and/or procedure from the memory location to the server. The server executes the functions and/or procedure and returns to the result to a client-side memory location identified by the client using at least one atomic memory operation. According to another aspect of the invention, server-directed data flow is provided for improved data analytics and high performance computing tasks.

In another exemplary embodiment, an aggregator client collects data from multiple clients (for example, using an HPC interconnect network between the clients) and sends the data to the server to reduce network traffic. The aggregator client uses one or more list functions, discussed further below in conjunction with FIG. 5, to send the set of aggregated requests in a single network message to the server. In an exemplary HPC environment, the disclosed asynchronous storage access methods allow the clients to run asynchronously and perform other tasks while the server is performing the requested functions on behalf of the client.

In one exemplary implementation, the MDHIM client and MDHIM server use a modified protocol to communicate, as discussed further below in conjunction with FIG. 5. Generally, the MDHIM client will provide a memory address identifier to the MDHIM server. When processing a put operation, the MDHIM server will perform a Remote Direct Memory Access (RDMA) read operation of the memory buffer identified by the memory address identifier and then insert the obtained key-value pair into the local key-value store. When processing a get operation, the MDHIM server will perform a get on the local key-value store, and then an RDMA write of the obtained key-value(s) into the client memory location identified by the memory address identifier.

The partitioned key-value store described, for example, in U.S. patent application Ser. No. 14/143,749, filed Dec. 30, 2013, entitled "Parallel Storage System with Burst Buffer Appliance for Storage of Partitioned Key-Value Store Across a Plurality of Storage Tiers," decreases latency for distributed and ranged key-value store operations for HPC supercomputers that have optimized message passing libraries, such as Message Passing Interface (MPI).

The atomic memory operations disclosed herein comprise one sided remote atomic memory operations, such as one-sided Remote Direct Memory Access (RDMA) operations, that provide server-side directed data flow to further optimize MDHIM. The provided server-side directed I/O alleviates clients' processors from doing I/O activity and thereby improves computational throughput. In addition, the server-side directed I/O improves the analytic ability and throughput of MPI-linked parallel applications running on large HPC or cloud-compute clusters.

According to a further aspect of the invention, MDHIM clients can send stored procedures (or pointers to stored procedures) to execute on the MDHIM servers which will allow extremely efficient filtering, for example, on the MDHIM servers where the smaller result is then stored directly by the MDHIM server into the memory of the MDHIM client. In the case of filter operations, for example, the server typically stores a vast amount of data, only a portion of which is of interest to the client. Thus, the server can perform a filter operation and store the desired results in the memory of the client.

For applications doing large bulk get/put operations, for example, as is typical for scientific computing in HPC, the ability to offload the I/O computation to the MDHIM server is particularly important. This will be especially useful, for example, for multi-tenancy virtual machines such as those in a cloud environment in which processes waiting on I/O will not perturb active processes with their I/O interrupts. Even for single-tasking supercomputers, this will benefit applications that can do asynchronous operations so that the applications can do other useful work while the server-side I/O occurs.

FIG. 1 illustrates an exemplary partitioned key-value store 100 in which the invention may be implemented. As shown in FIG. 1, the exemplary partitioned key-value store 100 comprises an exemplary application, such as application 110, that can read, write and/or query key-value data in the exemplary partitioned key-value store 100, using one or more MDHIM clients, such as the exemplary MDHIM client 120. One or more MDHIM servers, such as MDHIM server 130, control the storage of key-value data using a key-value abstraction layer 140 and a local key-value store 150 on a compute node 160 in a high performance computing (HPC) environment, in a known manner. Generally, the local key-value store 150 processes key-value operations such as leveldb or pblisam.

An exemplary architecture for an MDHIM partitioned key-value store is discussed further below in conjunction with FIG. 3. For a more detailed discussion of MDHIM, see, for example, James Nunez et al., "Multidimensional Data Hashing Indexing Metadata/Middleware (MDHIM) Project," Ultrascale Systems Research Center, High Performance Computing Systems Integration (2012-2013), incorporated by reference herein.

In the exemplary embodiment of FIG. 1, a burst buffer appliance 190 in the partitioned key-value store 100 is configured to store key-value data on first and second storage tiers comprising respective disjoint subsets of storage. In this manner, the burst buffer appliance provides access to an expanded storage footprint, including multi-tier key-value storage.

As shown in FIG. 1, the exemplary burst buffer appliance 190 comprises parallel log structured file system (PLFS) burst buffer software 170 that provides access to an exemplary flash storage tier 180 and an exemplary disk storage tier 195. The exemplary flash storage tier 180 may be integrated within the burst buffer appliance 190 or an external storage device. The parallel log structured file system (PLFS) may be based on, for example, John Bent et al., "PLFS: A Checkpoint Filesystem for Parallel Applications," Int'l Conf. for High Performance Computing, Networking, Storage and Analysis 2009 (SC09) (Nov. 2009), incorporated by reference herein.

As shown in FIG. 1, the exemplary burst buffer appliance 190 is configured to process tiering commands from the MDHIM server 130 on compute node 160, as well as read and write commands from the local key-value store 150 on compute node 160.

The burst buffer appliance 190 is configured to communicate with clients, object storage servers and MDHIM servers 130 over a network. The burst buffer appliance 190 in the present embodiment is assumed to comprise a flash memory or other high-speed memory having a substantially lower access time than the disk storage tier 195. The burst buffer appliance 190 may optionally comprise an analytics engine and may include other components.

Although flash memory will often be used for the high-speed memory of the burst buffer appliance 190, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer appliance" as used herein is intended to be broadly construed, so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients executing on compute nodes (not shown) and a file system such as storage tiers 180, 195, for storing bursts of data associated with different types of I/O operations.

The burst buffer appliance 190 further comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein may be viewed as examples of what are more generally referred to as "computer program products" storing executable computer program code.

Also included in the exemplary burst buffer appliance is network interface circuitry. The network interface circuitry allows the burst buffer appliance to communicate over the network with other devices. The network interface circuitry may comprise, for example, one or more conventional transceivers.

The exemplary storage tiering functionality of the burst buffer appliance 190 may be implemented at least in part in the form of software that is stored in memory and executed by a processor.

The burst buffer appliance 190 comprising processor, memory and network interface components as described above is an example of what is more generally referred to herein as a "processing device." Each of the devices herein may similarly be implemented as a processing device comprising processor, memory and network interface components.

Although only a single burst buffer appliance 190 is shown in the FIG. 1 embodiment, a given partitioned key-value store in other embodiments may comprise multiple burst buffer appliances 190.

The exemplary flash storage tier 180 and exemplary disk storage tier 195 in the present embodiment are arranged into first and second storage tiers, also denoted as Storage Tier 1 and Storage Tier 2, although it is to be appreciated that more than two storage tiers may be used in other embodiments. Each of the exemplary flash storage tier 180 and exemplary disk storage tier 195 may be viewed as being representative of an object storage target of a corresponding object storage server. The first and second storage tiers comprise respective disjoint subsets of the object storage servers. The different storage tiers 180 and 195 in this embodiment comprise different types of storage devices having different performance characteristics. For a more detailed discussion of the performance characteristics of the different exemplary storage tiers 180 and 195, see, for example, U.S. patent application Ser. No. 14/143,749, filed Dec. 30, 2013, entitled "Parallel Storage System with Burst Buffer Appliance for Storage of Partitioned Key-Value Store Across a Plurality of Storage Tiers," incorporated by reference herein.

The exemplary embodiment of FIG. 1 provides an MDHIM partitioned key-value store with tiered storage where the MDHIM server 130 executes on a compute node 160. The exemplary MDHIM server 130 can be implemented in a conventional manner, and be unaware of tiering provided by the burst buffer appliance 190 and transparently benefit from the improved performance. In another variation, the MDHIM server 130 can be burst buffer aware and interface to the application programming interface (API) of the burst buffer appliance 190 to help make intelligent tiering decisions using one or more tiering commands, as shown in FIG. 1.

Figure 2:
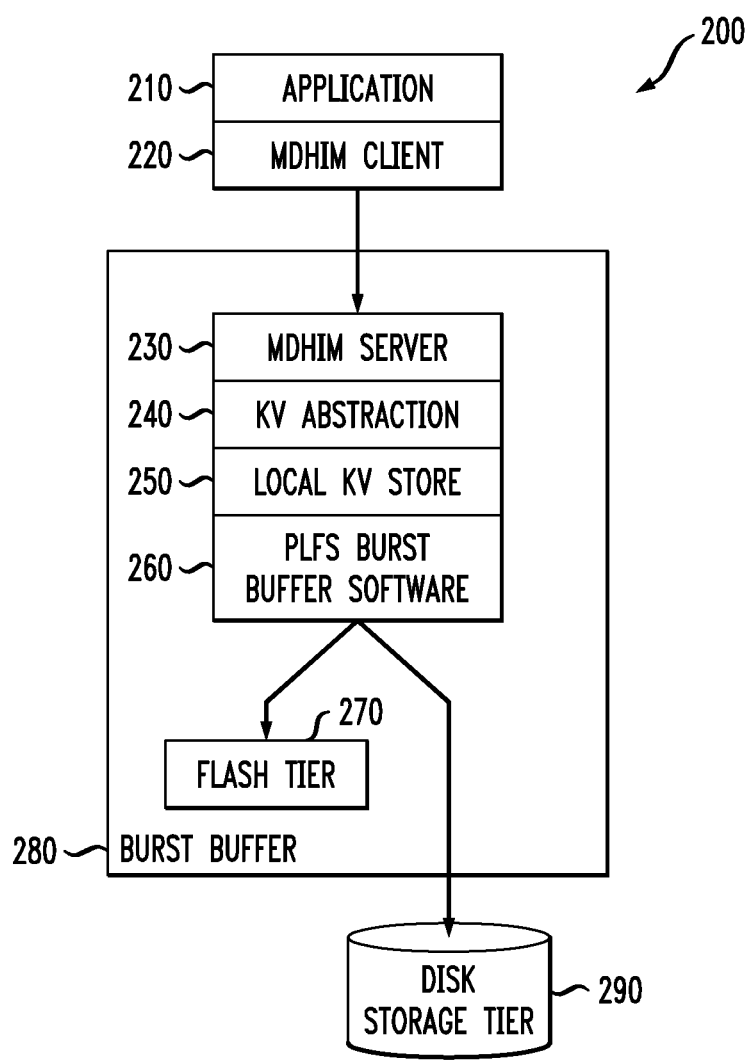
FIG. 2 illustrates an exemplary alternate partitioned key-value store in which the invention may be implemented.

FIG. 2 illustrates an exemplary alternate partitioned key-value store 200 in which the invention may be implemented. Generally, in the embodiment of FIG. 2, the MDHIM server 230 executes on the burst buffer appliance 280. In this manner, MDHIM can be implemented in a high performance computing (HPC) environment in which the compute nodes 160 do not provide storage. In addition, when the MDHIM servers 230 execute on the burst buffer appliance 280, processing resources on the compute nodes 160 are not consumed by the MDHIM servers 230.

As shown in FIG. 2, the exemplary partitioned key-value store 200 comprises an exemplary application, such as application 210, that can read, write and/or query key-value data in the exemplary partitioned key-value store 200, using one or more MDHIM clients, such as the exemplary MDHIM client 220, in a similar manner to FIG. 1. One or more MDHIM servers, such as MDHIM server 230 executing on the burst buffer appliance 280, control the storage of key-value data using a key-value abstraction layer 240 and a local key-value store 250.

The exemplary burst buffer appliance 280 further comprises the PLFS burst buffer software 260 that provides access to an exemplary flash storage tier 270 and an exemplary disk storage tier 290, in a similar manner to FIG. 1. The exemplary flash storage tier 270 may be integrated within the burst buffer appliance 280, as shown in FIG. 2, or an external storage device.

Figure 3:
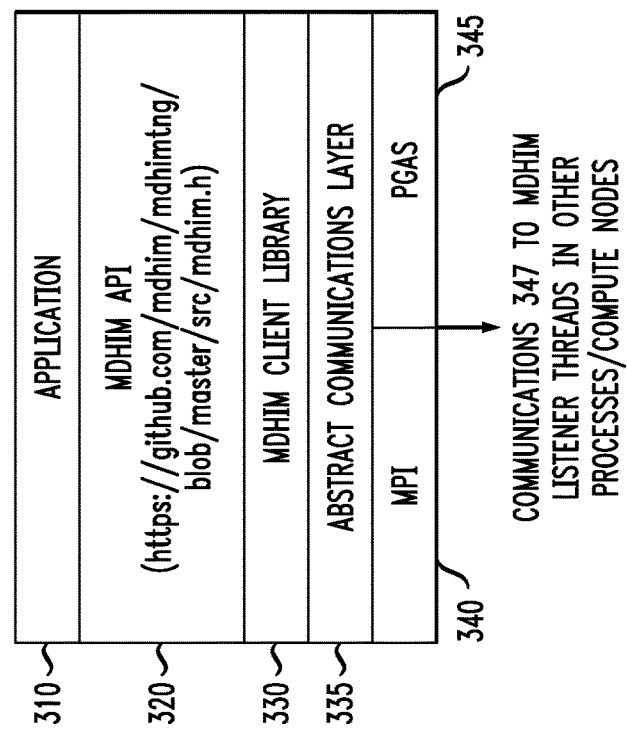
FIG. 3 illustrates an exemplary conventional architecture and application programming interface (API) for an MDHIM partitioned key-value store.

FIG. 3 illustrates an exemplary conventional architecture and application programming interface (API) for an MDHIM partitioned key-value store. Generally, an MDHIM framework employs one process address space, with the original process and the MDHIM listener thread in the same process space after the call to mdhim_init( ) which caused the MDHIM Listener thread to be spawned. Users run an MPI job and call mdhim_init( ) on every process/thread/MPI rank/compute node where an MDHIM server is desired.

MDHIM then spawns a listener thread to receive MDHIM communications 348 from other processes making calls to mdhim such as mdhim_get or mdhim_put. As discussed further below, subsequent calls to mdhim (such as mdhim_put or mdhim_get) then create an MPI unexpected message which is sent to one of the MDHIM servers. MDHIM can run as client/server where each compute node is running both an MDHIM client and an MDHIM server.

MDHIM communications 348 from other processes are processed in a first layer comprising the Message Passing Interface (MPI) 350 or PGAS 355, followed by an abstract communications layer 360, MDHIM Server Thread 370, abstract key-value interface 380 and key-value operations such as leveldb 385 and Pbl-Isam 390, in a known manner.

Communications 347 to MDHIM Listener threads running in other processes/compute nodes are generated by an application 310 that provides messages to an MDHIM application programming interface (API) 320 using an MDHIM client library 330 and an abstract communications layer 335. Communications 347 are sent to other processes using the Message Passing Interface (MPI) 340 or PGAS 345.

The exemplary conventional MDHIM application programming interface (API) 320 comprises the following exemplary operations:

MDHIM init—initializes MDHIM structures and creates range server threads;
MDHIM_PUT—put one or more keys in a data store;
MDHIM_GET—get one or more keys from the data store;
MDHIM insert—a list function that inserts new records with key and record data;
MDHIM flush—makes key distribution information available to MDHIM clients;
MDHIM find—find a record using primary key (match, best higher or lower) and set the absolute record number;
MDHIM close—close an MDHIM file; and
MDHIM read—a list function that read records (key and data), using absolute record numbers.

It is noted that extensions to the conventional MDHIM API are discussed below in conjunction with FIG. 5. For a more detailed discussion of MDHIM, see, for example, James Nunez et al., "Multidimensional Data Hashing Indexing Metadata/Middleware (MDHIM) Project," Ultrascale Systems Research Center, High Performance Computing Systems Integration (2012-2013), incorporated by reference herein.

In an exemplary embodiment, the local key-values are sorted locally by the local store and globally by the overall MDHIM framework. The local and global sorting can be leveraged to provide batch input/output (TO) operations that aggregate multiple requests into batch operations on one or more sorted ranges. In this manner, desired data can be obtained using a reduced number of messages over the network. For a more detailed discussion of key sorting techniques, see, for example, U.S. patent application Ser. No. 14/143,758, filed Dec. 30, 2013, entitled "Partitioned Key-Value Store With One-Sided Communications for Secondary Global Key Lookup by Range-Knowledgeable Clients," incorporated by reference herein.

HPC applications typically will access contiguous sets of keys in parallel. Therefore, one process in an HPC job will access one sorted range and another will access a different sorted range. The global sort allows a better storage access pattern where each process only queries from a small set of the range server nodes. In addition, the local sort allows individual key requests to result in fewer storage operations.

Figure 4:
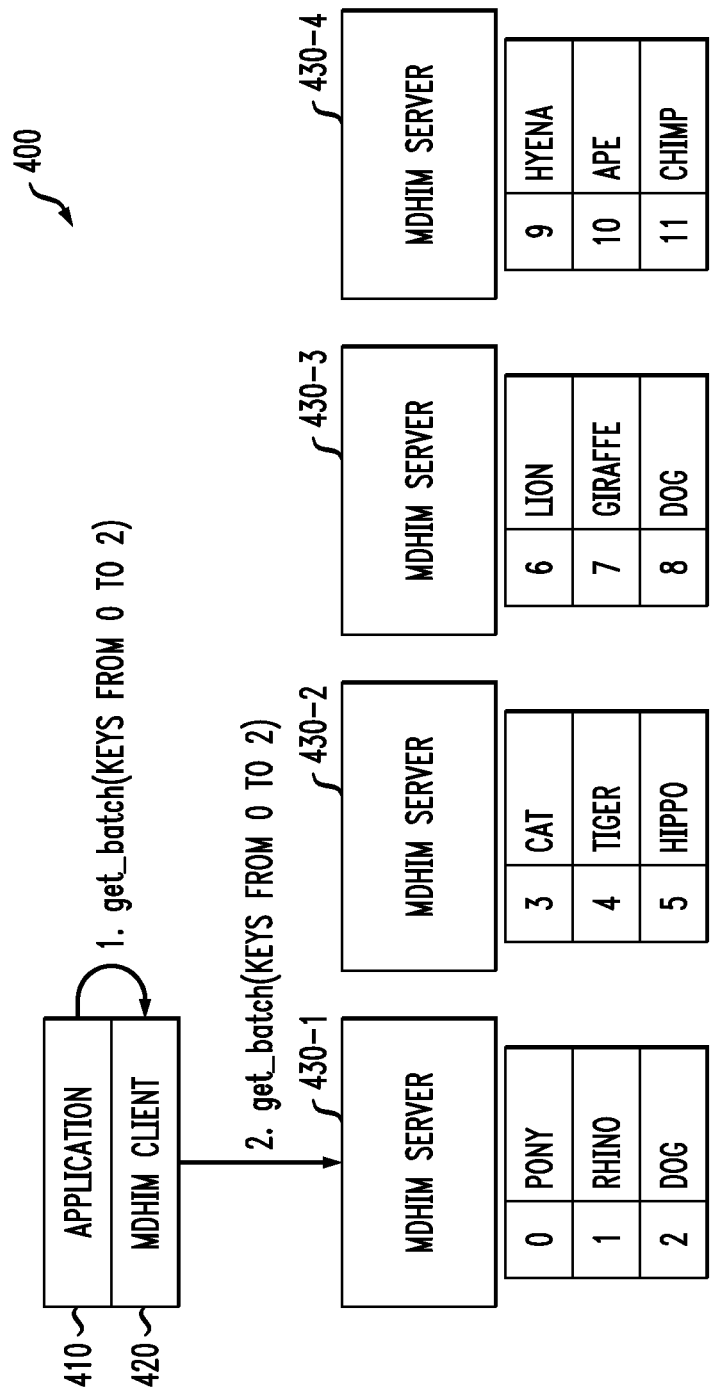
FIG. 4 illustrates the processing of a batch operation in an exemplary partitioned key-value store incorporating global sorting.

FIG. 4 illustrates the processing of a batch operation in an exemplary partitioned key-value store 400 incorporating a global sorting feature. As shown in FIG. 4, the exemplary partitioned key-value store 400 comprises an exemplary application 410 that can read, write and/or query key-value data in the exemplary partitioned key-value store 400, using one or more MDHIM clients, such as the exemplary MDHIM client 420. One or more MDHIM servers 430-1 through 430-N(N is equal to 4 in the exemplary embodiment of FIG. 4) control the storage of key-value data.

The exemplary application 410 initially issues an aggregated "get batch" request to the client 420 during a first step, as follows:
get_batch(keys from 0 to 2)

The range-knowledgeable client 420 knows the keys in the range of 0-2 are stored by the first MDHIM server 430-1 and sends the get batch request to the appropriate server 430-1 during a second step, as follows:
get_batch(keys from 0 to 2)

In this manner, multiple requests are aggregated into "batches" to send fewer messages over the network.

Without a global sort, even if the application knows that it wants a sorted batch of keys, the MDHIM client must break this into multiple small individual requests to a large number of servers. The global sorting allows the single requests from the application 410 to the client 420 to become a single request over the network between one client 420 and one server 430-1.

As noted above, in one exemplary implementation, the MDHIM client and MDHIM server use a modified protocol to communicate, as discussed further below in conjunction with FIG. 5. Generally, the MDHIM client will provide a memory address identifier to the MDHIM server. When processing a put operation, the MDHIM server will perform a Remote Direct Memory Access (RDMA) read operation of the memory buffer identified by the memory address identifier and then insert the obtained key-value pair into the local key-value store. When processing a get operation, the MDHIM server will perform a get on the local key-value store, and then an RDMA write of the obtained key-value(s) into the client memory location identified by the memory address identifier.

FIG. 5 illustrates portions of an exemplary client application programming interface (API) 500 incorporating aspects of the present invention. As shown in FIG. 5, the exemplary client API 500 provides client commands for individual and list-based versions of the atomic memory get and put operations. For list-based get and put operations, the overhead is incurred once for all key-values in the list. Generally, the operations identify the key-values and memory buffer identifier, as well as the size of the memory item and the completion criteria (event, defining when the required processing is complete). For a put operation, the memory buffer identifier identifies the memory location where the key-values are read from. For a get operation, the memory buffer identifier identifies the memory location where the key-values are written to.

The exemplary mdhim_execute command comprises a function_point that provides a pointer to where the desired procedure to be executed by the server is stored. The desired procedure can be an arbitrary function or a set of function calls. In one exemplary embodiment, the application 110 requests the MDHIM Server 130 to perform one or more functions or procedures that are stored in a particular client-side memory location. The MDHIM Client 120 transmits the functions and/or procedure from the memory location to the MDHIM Server 130. The MDHIM Server 130 executes the functions and/or procedure and returns to the result to a client-side memory location identified by the MDHIM Client 120 using at least one atomic memory operation. The mdhim_poll command allows the client to query whether the previously issued remote procedure request is complete.

FIG. 6 illustrates exemplary pseudo code 600 for a server-side put operation (using the exemplary client API 500 of FIG. 5). As shown in FIG. 6, a worker thread is created to process the put operation. After the memory is allocated, a copy operation is performed using an RDMA from the application and a local insert is performed with the key-values.

It is noted that the pseudo code for a server-side get operation would be readily apparent to a person of ordinary skill in the art, based on the pseudo code 600 in FIG. 6 for a put operation.

Figure 7:
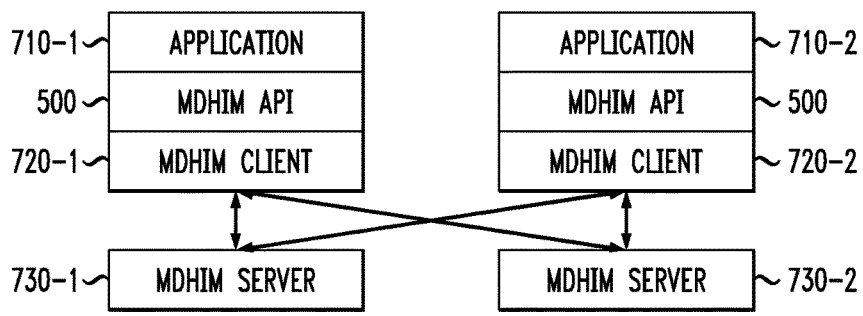
FIG. 7 illustrates an exemplary architecture for a partitioned key-value store that processes atomic memory operations (amo) in accordance with the present invention.

FIG. 7 illustrates an exemplary architecture 700 for a partitioned key-value store 100 that processes atomic memory operations (amo) in accordance with the present invention. Generally, an MDHIM client 720 performs in the same manner as conventional MDHIM clients. The MDHIM client 720 selects the appropriate range server based on the key distribution in a similar manner as conventional MDHIM clients. FIG. 7 illustrates the exemplary architecture differences needed for the user application 710 and the MDHIM server 730 to process atomic memory operations. It is noted that while FIG. 7 illustrates clients 720 and servers 730 on separate compute nodes, the clients and servers may execute on the same compute nodes. As shown in FIG. 7, each MDHIM client 720-1, 720-2 communicates with each MDHIM server 730-1, 730-2, and each MDHIM server 730-1, 730-2 communicates with each MDHIM client 720-1, 720-2 (but the two MDHIM clients 720-1, 720-2 need not communicate with each other and the two MDHIM servers 730-1, 730-2 need not communicate with each other).

Figure 8:
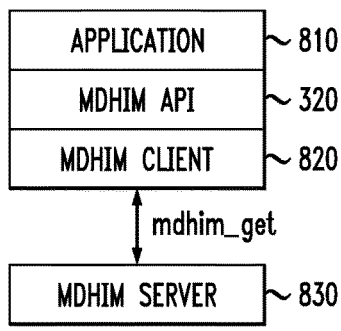
FIG. 8 illustrates a conventional MDHIM configuration for processing conventional memory operations.

FIG. 8 illustrates a conventional MDHIM configuration 800 for processing conventional memory operations. In response to an mdhim_get(key,buffer) command, the conventional application 810 issues an mdhim_get call in accordance with the conventional MDHIM API 320 of FIG. 3 and the client 820 forwards the mdhim_get call to the server 830 which retrieves the data and returns it to the client 820. The client 820 copies the retrieved data into the buffer, the function call finishes, and the client 820 (that was waiting) now finds the data in its buffer.

Figure 9:
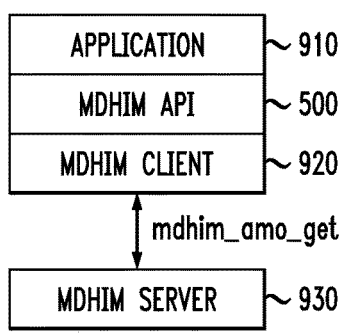
FIG. 9 illustrates an MDHIM configuration for processing atomic memory operations in accordance with the present invention.

FIG. 9 illustrates an MDHIM configuration 900 for processing atomic memory operations in accordance with the present invention. As shown in FIG. 9, in response to an mdhim_amo_get(key,pointer,event) command in accordance with the extended MDHIM API 500 of FIG. 5, the application 910 issues an mdhim_amo_get call and the client 920 forwards the mdhim_amo_get call to the server 930. The mdhim_amo_get call returns immediately and the application 910 can perform other tasks. The server 930 retrieves the data and uses RDMA to put the retrieved data into the application memory location. Later, the application can query the event using the mdhim_poll command of the API 500. The event status will be available at the server 930. The event status may be available at the client 920. Various methods of pre-fetching/pre-sending the event status to the client 920 may eliminate the need for a round-trip communication to the server 930 when the application 910 queries the event status, as would be apparent to a person of ordinary skill in the art. These methods could be periodic polling for event status or piggybacking other communications between client 920 and server 930.

It is to be appreciated that the particular operations and associated messaging illustrated herein are exemplary only, and numerous other types of operations and messaging may be used in other embodiments.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, clients, servers, storage devices or other components are possible in the partitioned key-value stores of the present invention. Such components can communicate with other elements of the partitioned key-value store over any type of network or other communication media.

As indicated previously, components of a partitioned key-value store 100 and burst buffer appliance 190 as disclosed herein can be implemented at least in part in the form of one or more software programs stored in memory and executed by a processor of a processing device. A memory having such program code embodied therein is an example of what is more generally referred to herein as a "computer program product."

The partitioned key-value store 100, burst buffer appliance 190 or portions thereof may be implemented using one or more processing platforms each comprising a plurality of processing devices. Each such processing device may comprise processor, memory and/or network interface components.

As indicated above, atomic memory operations in a partitioned key-value store 100 such as that described herein can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of partitioned key-value stores and associated clients, servers and other processing devices that can benefit from the atomic memory operation functionality as described herein. Also, the particular configurations of system and device elements shown in FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method performed by a server for performing a memory operation in a partitioned key-value store, comprising:

receiving a request from an application for at least one atomic memory operation, wherein said application executes on a compute node having a client of said partitioned key-value store and said atomic memory operation comprises a memory address identifier of a memory location of said client; and in response to said atomic memory operation, said server employing one or more remote memory operations to perform one or more of (i) reading a client-side memory location identified by said memory address identifier and storing one or more key-value pairs from said client-side memory location in a local key-value store of said server; and (ii) obtaining one or more key-value pairs from said local key-value store of said server and writing said obtained one or more key-value pairs into said client-side memory location identified by said memory address identifier, wherein program control returns to said application when said server receives said request from said application for said atomic memory operation such that said application performs one or more additional tasks while said server performs said one or more remote memory operations.

2. The method of claim 1, wherein said partitioned key-value store is based on a Multidimensional Data Hashing Indexing Middleware (MDHIM) framework.

3. The method of claim 1, wherein said partitioned key-value store employs Message Passing Interface (MPI) communications.

4. The method of claim 1, wherein said one or more of reading from and writing into said client-side memory location comprises a Remote Memory Access (RMA).

5. The method of claim 1, further comprising the steps of performing one or more functions obtained from said client-side memory location; and returning a result of said one or more functions to said client using one or more of said atomic memory operations.

6. The method of claim 1, wherein said atomic memory operation comprises a list-based atomic memory operation, wherein said list-based atomic memory operation is executed for a plurality of key-value pairs in a list.

7. A server apparatus for performing a memory operation in a partitioned key-value store, the server apparatus comprising:

a memory; and at least one hardware device, coupled to the memory, operative to implement the following steps:

receive a request from an application for at least one atomic memory operation, wherein said application executes on a compute node having a client of said partitioned key-value store and said atomic memory operation comprises a memory address identifier of a memory location of said client; and in response to said atomic memory operation, said server apparatus employing one or more remote memory operations to perform one or more of (i) reading a client-side memory location identified by said memory address identifier and storing one or more key-value pairs from said client-side memory location in a local key-value store of said server; and (ii) obtaining one or more key-value pairs from said local key-value store of said server and writing said obtained one or more key-value pairs into said client-side memory location identified by said memory address identifier, wherein program control returns to said application when said server receives said request from said application for said atomic memory operation such that said application performs one or more additional tasks while said server performs said one or more remote memory operations.

8. The server apparatus of claim 7, wherein said partitioned key-value store is based on a Multidimensional Data Hashing Indexing Middleware (MDHIM) framework.

9. The server apparatus of claim 7, wherein said partitioned key-value store employs Message Passing Interface (MPI) communications.

10. The server apparatus of claim 7, wherein said one or more of reading from and writing into said client-side memory location comprises a Remote Memory Access (RMA).

11. The server apparatus of claim 7, further comprising the steps of performing one or more functions obtained from said client-side memory location; and returning a result of said one or more functions to said client using one or more of said atomic memory operations.

12. The server apparatus of claim 7, wherein said atomic memory operation comprises a list-based atomic memory operation, wherein said list-based atomic memory operation is executed for a plurality of key-value pairs in a list.

13. An article of manufacture for performing a server-side memory operation in a partitioned key-value store, comprising a tangible machine readable recordable storage medium comprising one or more programs which when executed implement the steps of:

receiving a request from an application for at least one atomic memory operation, wherein said application executes on a compute node having a client of said partitioned key-value store and said atomic memory operation comprises a memory address identifier of a memory location of said client; and in response to said atomic memory operation, said server employing one or more remote memory operations to perform one or more of (i) reading a client-side memory location identified by said memory address identifier and storing one or more key-value pairs from said client-side memory location in a local key-value store of said server; and (ii) obtaining one or more key-value pairs from said local key-value store of said server and writing said obtained one or more key-value pairs into said client-side memory location identified by said memory address identifier, wherein program control returns to said application when said server receives said request from said application for said atomic memory operation such that said application performs one or more additional tasks while said server performs said one or more remote memory operations.

14. The article of manufacture of claim 13, wherein said partitioned key-value store is based on a Multidimensional Data Hashing Indexing Middleware (MDHIM) framework.

15. The article of manufacture of claim 13, wherein said one or more of reading from and writing into said client-side memory location comprises a Remote Memory Access (RMA).

16. The article of manufacture of claim 13, further comprising the steps of performing one or more functions obtained from said client-side memory location; and returning a result of said one or more functions to said client using one or more of said atomic memory operations.

17. The article of manufacture of claim 13, wherein said atomic memory operation comprises a list-based atomic memory operation, wherein said list-based atomic memory operation is executed for a plurality of key-value pairs in a list.

18. The method of claim 1, wherein said application queries for a status of said at least one atomic memory operation.

19. The server apparatus of claim 7, wherein said application queries for a status of said at least one atomic memory operation.

20. The article of manufacture of claim 13, wherein said application queries for a status of said at least one atomic memory operation.

\* \* \* \* \*

UNITED STATES PATENT AND TRADEMARK OFFICE
CERTIFICATE OF CORRECTION

| | | |
|---|---|---|
| PATENT NO. | : 9,563,426 B1 | Page 1 of 1 |
| APPLICATION NO. | : 14/502231 | |
| DATED | : February 7, 2017 | |
| INVENTOR(S) | : John M. Bent et al. | |

It is certified that error appears in the above-identified patent and that said Letters Patent is hereby corrected as shown below:

In the Specification

Column 1, Line 25, please add the following after "Computing Environment,"" --(now U.S. Patent. No. 9,245,048),--.

Column 3, Line 30, replace "returns to the result" with --returns the result--.

Column 7, Line 2, replace "MDHIM Listener thread" with --MDHIM listener thread--.

Column 7, Line 56, replace "batch input/output (TO)" with --batch input/output (IO)--.

Column 9, Line 6, replace "returns to the result" with --returns the result--.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*